Feb. 4, 1936.　　　　F. H. KERNEN　　　　2,029,662
DISPLAY TRAY
Original Filed April 24, 1934

Inventor

Frank H. Kernen

By Clarence A. O'Brien
Attorney

Patented Feb. 4, 1936

2,029,662

UNITED STATES PATENT OFFICE 2,029,662

DISPLAY TRAY

Frank H. Kernen, Louisville, Ky.

Application April 24, 1934, Serial No. 722,153
Renewed July 8, 1935

1 Claim. (Cl. 229—2.5)

This invention relates to a display tray which is mainly designed for displaying cut meats in a display counter, the general object of the invention being to provide the tray with a raised bottom portion on which the meat is placed so that but a comparatively small amount of meat can be placed on display, while giving the appearance that a larger amount is contained in the tray.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
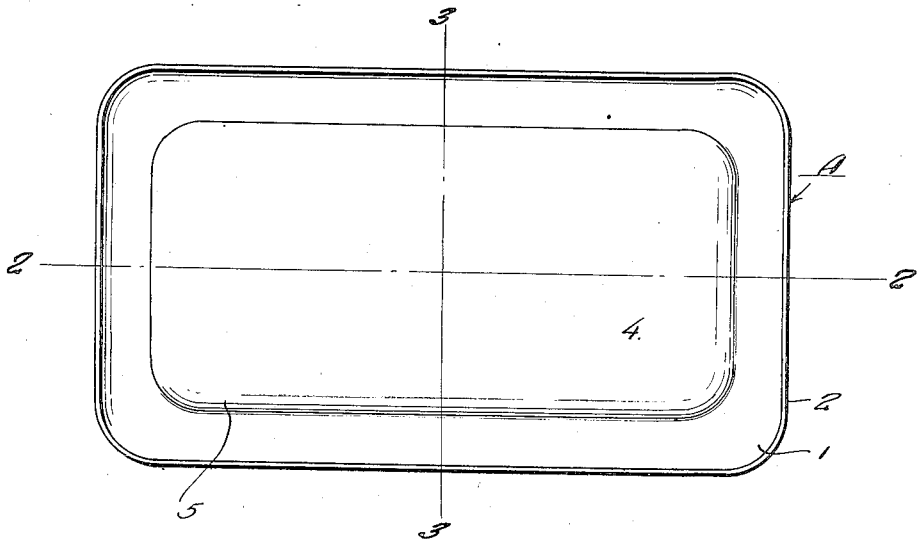
Figure 1 is a top plan view of the tray.
Figure 2:
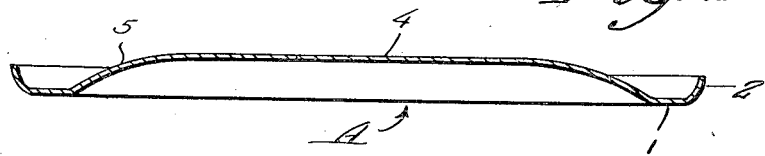
Figure 2 is a section on line 2—2 of Figure 1.
Figure 3:
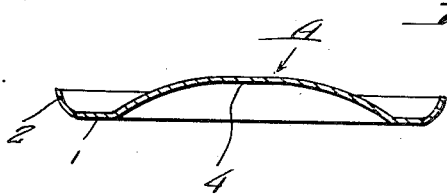
Figure 3 is a section on line 3—3 of Figure 1.

In this drawing, the letter A indicates the tray which is preferably formed of a single piece of material of any suitable kind and the tray includes the bottom part 1 and the upwardly and outwardly curved flange 2, and in carrying out the invention, I form the bottom part 1 with a raised portion 4, the margin of which is spaced a considerable distance from the flange and this raised portion has a flat major part, with its marginal portion curving downwardly and outwardly, as shown at 5. That portion of the bottom between the raised portion and the flange has both faces flat and the major part of the raised portion 4 is located above the plane of the top edge of the flange 2, as shown in Figs. 2 and 3.

Thus it will be seen that cuts of meats, such as steaks and chops, can be placed on this raised portion and a few cuts placed on this raised portion will give the appearance that the tray has a larger amount of meat thereon, so that an attractive display of the meats is secured with but a small quantity of the meats placed on the tray. Thus this tray will prevent loss to the butcher, and the tray with the meat properly placed thereon will show as large a volume of business with four or five steaks on display as an ordinary flat tray would with ten or fifteen steaks.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:

A display tray of the class described comprising a bottom part and an upstanding flange, said bottom part having a raised portion, the edges of which are spaced from the flange, the raised portion having its major part flat, with its edge portions curving downwardly and outwardly and the flat part of the raised portion being located in a plane above the plane of the upper edge of the flange.

FRANK H. KERNEN.